United States Patent [19]

Blandy et al.

[11] Patent Number: 5,561,785
[45] Date of Patent: Oct. 1, 1996

[54] SYSTEM FOR ALLOCATING AND RETURNING STORAGE AND COLLECTING GARBAGE USING SUBPOOL OF AVAILABLE BLOCKS

[75] Inventors: Geoffrey O. Blandy; Arthur J. Samodovitz, both of Vestal, N.Y.

[73] Assignee: International Business Machines Corporation, Armonk, N.Y.

[21] Appl. No.: 969,870

[22] Filed: Oct. 29, 1992

[51] Int. Cl.⁶ .......................... G06F 12/00; G06F 13/00
[52] U.S. Cl. .................. 395/497.01; 395/497.02; 395/600; 395/876; 395/736; 395/859; 395/292; 364/DIG. 1; 364/281.1; 364/281.6; 364/282.2
[58] Field of Search ........................... 395/600, 425, 395/200, 497.02, 497.01, 876, 736, 859, 292; 364/DIG. 1

[56] References Cited

U.S. PATENT DOCUMENTS

| | | | |
|---|---|---|---|
| 3,241,125 | 3/1966 | Tomasulo | 395/425 |
| 4,121,286 | 10/1978 | Venton | 395/425 |
| 4,528,624 | 7/1985 | Kamionka et al. | 395/650 |
| 4,663,706 | 5/1987 | Allen | 395/200 |
| 4,755,939 | 7/1988 | Watson | 364/300 |
| 4,907,151 | 3/1990 | Bartlett | 395/425 |
| 4,914,586 | 4/1990 | Swinehart et al. | 364/200 |
| 5,025,367 | 6/1991 | Gurd et al. | 395/600 |
| 5,088,036 | 2/1992 | Ellis | 395/425 |
| 5,109,336 | 4/1992 | Guenther et al. | 395/425 |
| 5,247,634 | 9/1993 | Cline et al. | 395/600 |
| 5,339,411 | 8/1994 | Heaton | 395/497.02 |
| 5,404,511 | 4/1995 | Notarianni | 395/600 |
| 5,493,652 | 2/1996 | Koufopavlou et al. | 395/497.01 |

*Primary Examiner*—Thomas G. Black
*Assistant Examiner*—Jean R. Homere
*Attorney, Agent, or Firm*—Arthur J. Samodovitz

[57] ABSTRACT

A computer storage management system establishes a subpool of available blocks of one size from a multiplicity of different storage frames. The available blocks are queued in the subpool. A garbage collection routine periodically or occasionally determines which of the frames having blocks on the subpool queue are completely available based on the number of available blocks on the queue for each frame. Then, the garbage collection routine removes from the queue and thereby reclaims the blocks of the frames which are completely available. The garbage collection routine also requeues the blocks from the other frames such that the blocks of these other frames are clustered with the other blocks of the same frame. Blocks are allocated from the front of the queue. Blocks of the one size from frames other than those represented at or near the end of the queue are returned to the front of the queue after use. Blocks of the one size from frames represented at or near the end of the queue are returned to a different position than the other blocks and allocated after other blocks on the queue. Consequently, as blocks are subsequently allocated from and some returned to the front of the queue, the blocks from the frames at or near the end of the queue are not allocated assuming the subpool is under utilized.

29 Claims, 6 Drawing Sheets

SYSTEM FOR ALLOCATING AND RETURNING STORAGE AND COLLECTING GARBAGE USING SUBPOOL OF AVAILABLE BLOCKS

The invention relates generally to management of computer main storage and deals more particularly with garbage collection, i.e. collection and joinder of free storage blocks and their return to main storage.

Computer systems include main storage for storing programs, data, control information, buffers, work areas, etc. Some of the main storage, such as that which stores a subsystem program, may be allocated at initial program load and required for the life of the subsystem while other of the main storage, such as that which stores data and work areas may be required only temporarily. An operating system allocates such main storage as needed (or "requested") by the subsystem, and the subsystem returns this main storage to the operating system when no longer needed. For example, in a large computer system, the operating system may allocate as many as 40,000 blocks of various sizes every second, and receive as returns a like number. Garbage collection is vital to periodically join the returned blocks with one another in main storage so the main storage can satisfy requests for blocks of different or larger sizes.

There are different known techniques for allocating main storage. In one known technique, the exact amount requested is sought regardless of size and allocated if available. While this technique does not waste any storage upon allocation, it may require substantial search time to locate an available block of the exact size and leads to variable fragmentation of the main storage. To address these problems, other known techniques allocate only predetermined sized blocks of main storage, and the returned blocks of each size are managed in a respective subpool for subsequent requests. For example, in a prior art IBM CP 67 system, when the first request is made, a block of the smallest predetermined size that equals or exceeds the request is allocated from main storage. Allocations for this block size continue from main storage until one of these blocks is returned. The return is made to a subpool dedicated to this size block, and the next allocation request for this size is satisfied from the subpool. Over time, many blocks are returned to many different subpools, each containing blocks of a size different than that of blocks in the other subpools. If there is a surge in demand for blocks of one size and then a sharp decrease in the demand for this size, the corresponding subpool will contain an excessive number of blocks of this size. Periodically, all the blocks from the subpools are returned to main storage, and contiguous blocks are joined to form larger blocks to satisfy subsequent requests. Such garbage collection is necessary to assure availability of blocks of different or larger sizes following a surge in demand and subsequent sharp decrease in demand. While the foregoing technique is effective in returning to main storage all the blocks in the subpools, the main storage still may be highly fragmented because blocks of any size are still in use leaving corresponding gaps in main storage. This fragmentation increases the search time to satisfy a subsequent request from main storage and increases the chances that a request cannot be satisfied from contiguous locations in main storage.

In another prior art IBM VM/XA SP1 system, the main storage is logically divided into frames of 4096 bytes of contiguous storage each. All allocations from and returns to main storage are with frames. Available blocks of predetermined sizes are maintained in subpools after allocation from main storage to minimize the searching required to identify an available block.

The following is a more detailed description of the prior art IBM VM/XA SP1 System. When an initial request is made for a block, one of the frames is logically divided into a number of blocks of the smallest predetermined size that satisfies the request. Then, one of the blocks is allocated to the requester. The remaining blocks are grouped together in a subpool and are anchored by a control block, provided for each frame of main storage and called a frame table entry ("FRMTE"). The blocks in the storage subpool are used to satisfy subsequent requests. When the subpool becomes empty due to these subsequent requests, and another request is made for the same size block, another frame is selected from main storage, divided into blocks, and one of the blocks used to satisfy the request. The remaining blocks are assigned to the same subpool but grouped under another frame table entry. As blocks are returned from either frame, they will be grouped under the respective frame table entry in this subpool. Subsequent allocation requests for the same size block will be satisfied from the same frame until this frame becomes empty of available blocks. Other subpools containing different size blocks are similarly generated. Periodically, the operating system reviews the contents of each frame table entry within each subpool to determine if the respective frame is completely available, and if so, returns the frame in its entirety to main storage. This technique is very effective in maximizing the number of frames that are returned in whole upon garbage collection. However, extra overhead is required to return blocks to the corresponding frame table entry. For each such return, the address of the frame table entry must first be calculated. Also, during return of each block, the system must determine if the block completes the frame or is the only available block in the frame. In the former case, the FRMTE is then dequeued for subsequent garbage collection. In the latter case, the FRMTE is requeued; this FRMTE was previously dequeued when it became devoid of available blocks to simplify searches through the queue for blocks to allocate. The use of the intermediate FRMTE queue requires additional storage references that burden the CPU.

Therefore, a general object of the present invention is to provide a storage allocation, return and garbage collection technique which yields a high number of completely available frames from garbage collection yet requires minimum overhead.

SUMMARY OF THE INVENTION

The invention resides in a computer storage management system, method and program product. Available blocks of one size from a multiplicity of different storage frames are queued in a subpool. A garbage collection routine periodically or occasionally determines which of the frames having blocks on the subpool queue are completely available based on the number of available blocks on the queue for each frame. Then, the garbage collection routine removes from the queue and thereby reclaims the blocks of the frames which are completely available. The garbage collection routine also requeues the blocks from the other frames such that the blocks of these other frames are clustered with the other blocks of the same frame. Blocks are allocated from the beginning of the queue and most blocks are returned to the beginning of the queue after use. Consequently, as blocks are subsequently allocated from and returned to the beginning of the queue, the blocks from the frames at or near the end of the queue are not allocated when the subpool is under utilized. Because some of the returned blocks are likely to be part of the frames represented by the blocks at or near the end of the queue, these returned blocks may complete the availability of such frames for reclamation. In the preferred embodiment of the invention, the returned blocks which are part of the frames represented at or near this other end of the queue are returned to a different position than the other blocks and allocated after other blocks on the queue. This increases the likelihood that the frames represented at or near this other end of the queue will be completely available at the next garbage collection time.

DETAILED DESCRIPTION OF THE PREFERRED EMBODIMENTS

Figure 1:
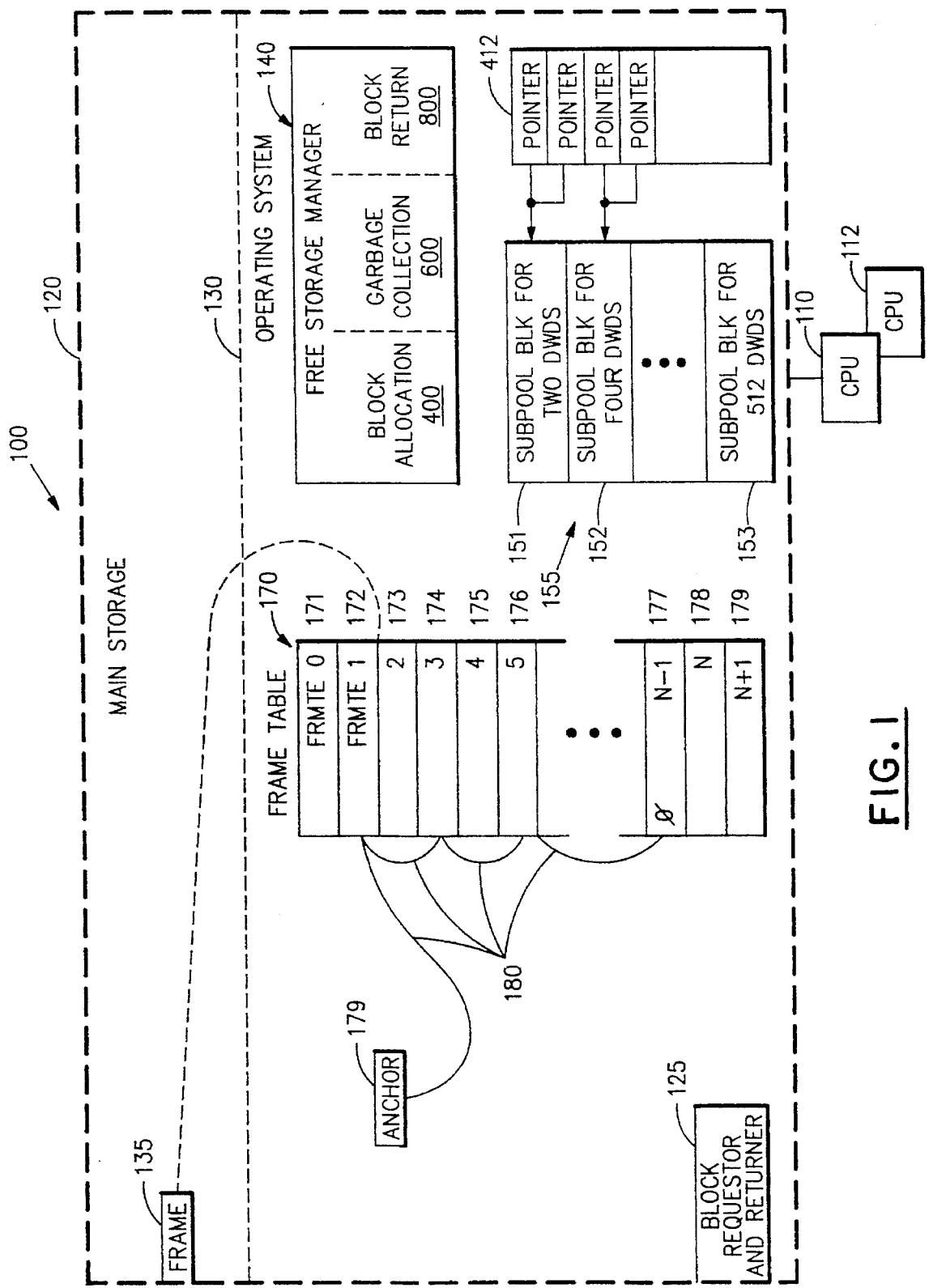
FIG. 1 is a block diagram of a computer system which includes an operating system that embodies the present invention.

Referring now to the figures in detail wherein like reference numerals indicate like elements throughout the several views, FIG. 1 illustrates a computer system generally designated 100 embodying the present invention. Computer system 100 comprises CPUs 110,112, an operating system 130 and main storage 120. By way of example, computer system 100 is provided by an IBM ES/9000 computer system and operating system 130 is provided by an IBM VM/ESA 1.1 operating system except for a free storage manager program 140 and associated structures and control blocks described below. The ES/9000 computer system is further described in a document entitled "ESA/390 Principles of Operation" with order number SA22-7201-08, and the VM/ESA 1.1 operating system is further described in a document entitled "VM/ESA General Information" with order number GC24-555. Both of these documents are available from International Business Machines Corporation at Mechanicsburg, Pa. The present invention can be used in a virtual machine or nonvirtual machine environment. Main storage 120 is logically divided into multiple frames such as frame 135 of 4096 contiguous bytes per frame. As described in more detail below, one or more blocks of fewer contiguous bytes of each frame can be allocated to satisfy a storage request. Such request can be made by various programs and subsystems within computer system 100 such as subsystem 125 within operating system 130.

The free storage manager program 140 within operating system 130 comprises a block allocation routine 400 to allocate main storage to the subsystem 125 as requested, a block return routine 800 to return the allocated blocks to subpools 151–153 when no longer needed, and a garbage collection routine 600 to periodically attempt to collect and join the returned blocks into completely available frames and return the completely available frames to main storage 120. These functions are described in detail below with reference to FIGS. 4–6, and use the following structures and control blocks.

To facilitate the rapid allocation and return of main storage blocks, the free storage manager program maintains multiple subpools of available blocks. All the blocks within the same subpool have the same size, and each subpool has blocks of a different size than the blocks of the other subpools. Each subpool is represented by a subpool control block 151–153 (FIG. 1) that contains an anchor for the subpool. All of the subpool control blocks are stored in contiguous locations in main storage and are arranged in ascending order to form a subpool control block table 155. As described in more detail with reference to FIG. 3, all the available blocks within the same subpool regardless of the frame to which they are associated are queued from a subpool control block anchor 320.

Operating system 130 also includes a frame table 170 which comprises frame control blocks or frame table entries (FRMTEs) 171–179 to represent all the frames from main storage. A global available frame queue anchor 179 points to the first FRMTE which is completely available (for any system use) and is not assigned to a subpool. This unassigned, completely available FRMTE points to the next unassigned, completely available FRMTE, and so on, until all unassigned, completely available FRMTEs are chained together to form a global available frame queue 180. The free storage manager allocates from the global available frame queue only when the subpool corresponding to the request size is empty. At which time, one of these unassigned, completely available frames is assigned to the empty subpool and one or more of the blocks is allocated. Some of the remaining FRMTEs represent frames that are assigned to a subpool and are partially or completely available. The completely available frames that are assigned to a subpool were at one time partially or completely utilized; the blocks have subsequently been returned to the subpool but the frame has not yet been returned to the global available frame queue. The remaining FRMTEs represent frames which are completely utilized and are not assigned to any subpool. An object of the present invention is to maximize the number of frames assigned to the different subpools that can be returned in whole to the global available frame queue while minimizing the amount of overhead required for implementation.

Figure 2:
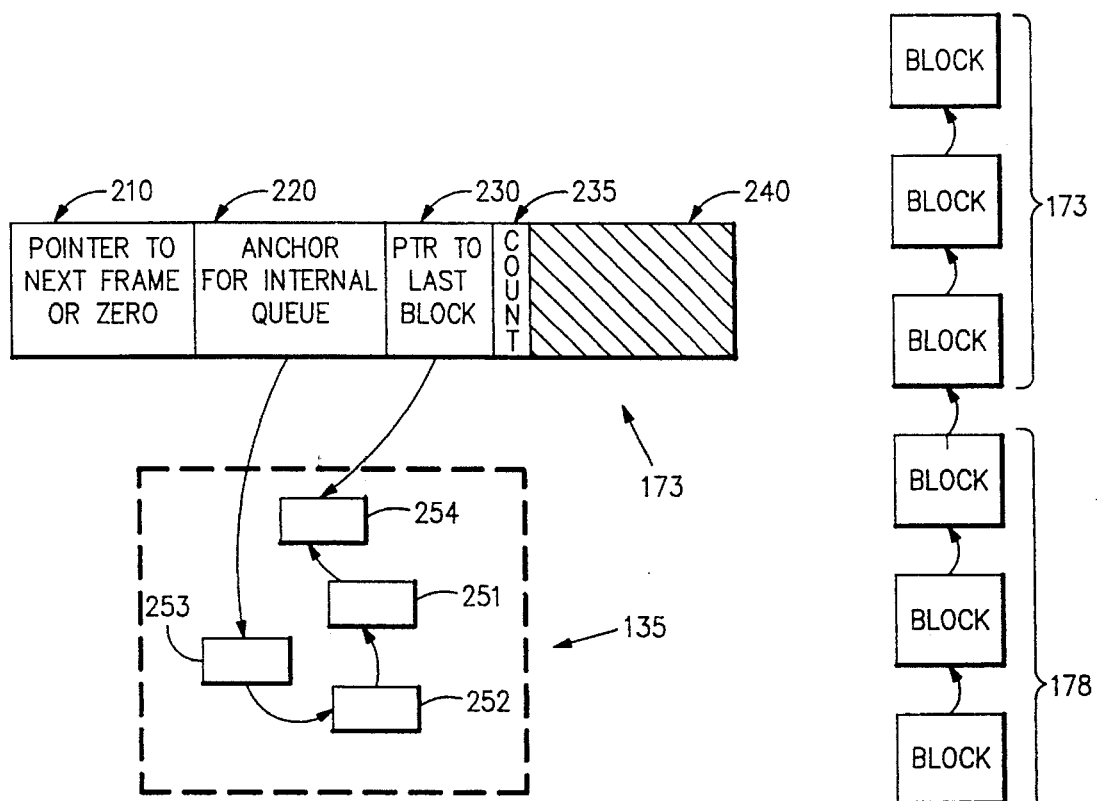
FIG. 2 is a diagram of a frame control block or frame table entry which is used by the operating system of FIG. 1 to represent and anchor all of the available blocks within a frame at garbage collection time.

FIG. 2 illustrates the FRMTE 173 during garbage collection time. FRMTE 173 represents frame 135 that is assigned to a subpool 151 and is partially available at this garbage collection time. Blocks 251, 152, 254 and 255 within frame 135 are then available and are queued from FRMTE. FRMTE 135 and all FRMTEs that represent frames assigned to a subpool are only referenced, used and modified at the time of garbage collection. These FRMTEs are not referenced, used or modified during subsequent allocation or return of their blocks so that changes to the subpool after garbage collection are not reflected in the FRMTEs. This reduces the amount of overhead required to maintain the FRMTEs and implement the present invention.

A first field 210 of the FRMTE 173 is a pointer to the next FRMTE in the subpool. The order of the frames in each subpool is established at garbage collection time and is described below. A second field 220 of FRMTE 173 is an anchor for a queue of the available blocks in the corresponding frame and points to the first such available block. This first available block points to the next available block, and so on until the last block. A third field 230 of FRMTE 173 points to the last available block in the frame. A fourth field 235 indicates the number of currently available blocks in the frame. Remaining fields 240 are used by operating system 130 for purposes unrelated to the present invention. (For FRMTEs that represent frames on the global available frame queue 180, field 210 points to the next FRMTE on queue 180, field 220 points to the preceding FRMTE and fields 230 and 235 are not used.)

Figure 3A:
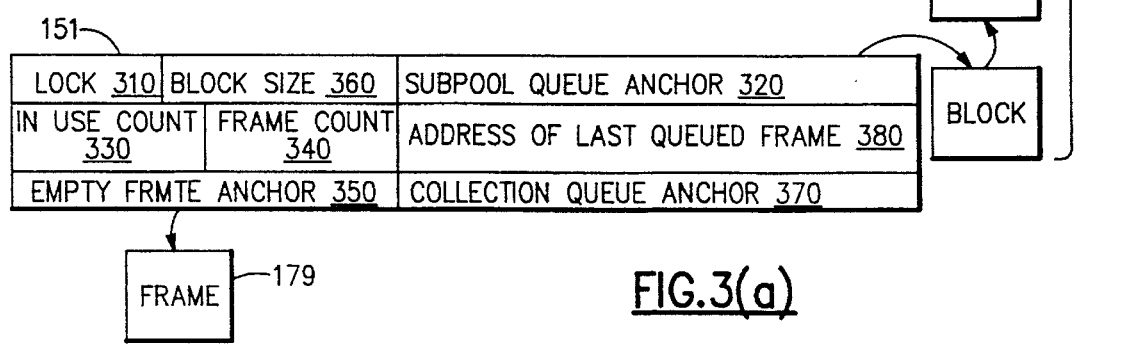
FIG. 3(a) is a diagram of a subpool control block and associated blocks at garbage collection time; the subpool control block is used by the operating system of FIG. 1 to represent and anchor all of the available blocks of the same size from one or more frames.

FIGS. 3(a) and (b) illustrate the subpool control block 151 and associated available blocks at two, respective instants in time. There are multiple fields within the subpool control block 151. A field 310 is a lock which is used to serialize access to the subpool amongst multiple processors. A field 320 is a subpool anchor which points to the first block (i.e. The beginning) of the subpool. The first block in the subpool points to the next block and so on until the last block. Blocks are allocated from the beginning of the queue. The field 320 is equal to zero when the subpool is empty. A field 330 indicates the number of blocks that were allocated from this subpool and are currently in use. A field 340 indicates the number of frames having blocks within this subpool. A field 350 is a pointer to a completely available frame 179 in this subpool, which frame was found to be completely available at the last garbage collection time and removed from the subpool queue (emanating from block anchor 320) but not yet returned to the global available frame queue 180. By way of example, garbage collection occurs every thirty seconds. At which time the completely available frames are identified and chained from the empty FRMTE anchor 350. These completely available blocks chained from the empty FRMTE anchor 350 are returned to the global available frame queue 180 at the beginning of the next garbage collection (provided that they are not re-assigned to the subpool before this next garbage collection time due to the subpool becoming empty). As described in more detail below, to reduce overhead, the frames from the empty frame queue are used before the frames from the global available frame queue 180 to satisfy an allocation request when the subpool queue emanating from the block anchor 320 becomes empty. A field 360 indicates the size of all blocks in the subpool. A field 370 is a collection queue anchor which points to the first block of a "collection queue". The collection queue is a repository for returned blocks of the one frame whose other returned blocks were queued at the end of the subpool queue at the last garbage collection time. However, it should be noted that according to the present invention, the collection queue can receive blocks for more than one frame whose returned blocks were queued at or near the end of the subpool queue during the last garbage collection time. The exact number of frames whose blocks are returned to the collection queue depends on the number of frames assigned to each subpool. For example, it may be desirable to return blocks from one fourth or even one half of the frames to the collection queue as long as the blocks from these frames were queued (either clustered or just localized) at or near the end of the subpool queue at the last garbage collection time. As described in more detail below, blocks are not allocated from the collection queue unless the subpool queue becomes empty and another request is made for blocks from the subpool. Thus, it is likely that the frames whose blocks were queued at or near the end of the subpool queue at the last garbage collection time and whose blocks are returned to the collection queue subsequently will be completely available at the next garbage collection time (if demand for this size ebbs).

Figure 3B:
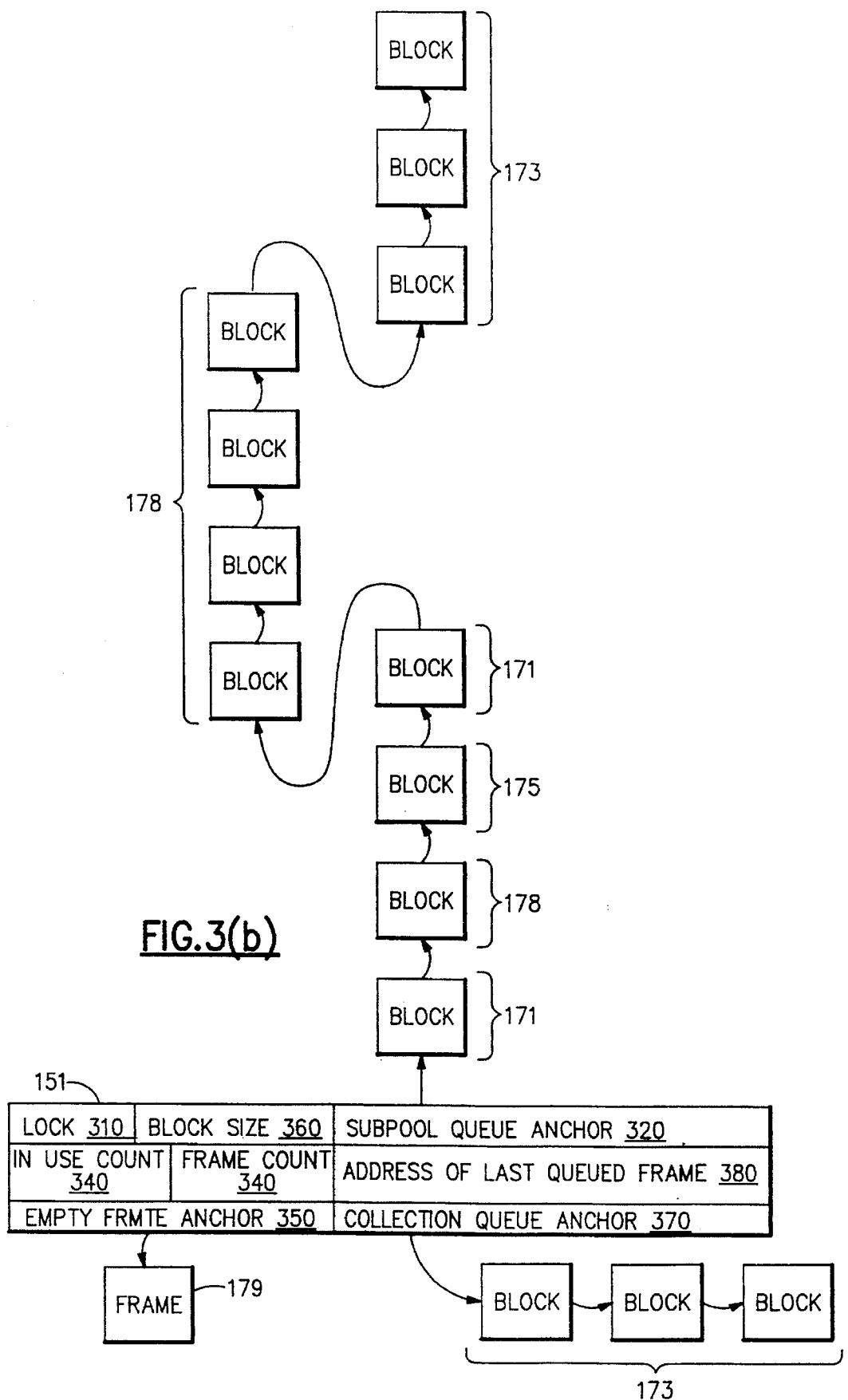
FIG. 3(b) is a diagram of the same subpool control block as FIG. 3(a) but at a later instant in time (but before the next garbage collection) and with a different subpool of associated blocks.

FIG. 3(a) illustrates the available blocks in the subpool immediately after garbage collection. The garbage collection routine has re-arranged the subpool queue to cluster together all of the available blocks from each frame. Each of the brackets indicates all of the available blocks within a respective one of the frames 175, 171, 178 and 173. The blocks from frame 173 have been clustered at the end of the subpool queue. Subsequently, blocks are returned to either the subpool queue or the collection queue as described above. As each block is returned it becomes the first in its queue, and displaces the other blocks in the queue one position rearward. This is also known as a "LIFO" or "push down stack" arrangement for allocating blocks from and returning blocks to each queue. While in some cases multiple blocks may be returned from one frame in a burst, in other cases, only a single block from a frame is returned at one time. The order in which the frames have blocks returned is unpredictable. FIG. 3(b) illustrates the same subpool queue a short time later (before the next garbage collection time), after the first two blocks of the queue from frame 175 are allocated and two other blocks from frames 178 and 171 are returned to the beginning of the queue. It should be noted that thousands of blocks of a subpool may be allocated and returned to the subpool in a second, but only two such allocations and two such returns are illustrated in FIG. 3(b) for simplicity. FIG. 3(b) also illustrates that three of the blocks from frame 173 have also been returned to the collection queue since the last garbage collection time. Assuming that there are a total of six blocks in frame 173, the situation illustrated in FIG. 3(b) reveals that frame 173 is now completely available. If all the blocks in the subpool queue preceding the blocks from frame 173, including the blocks subsequently returned to the front of the subpool queue, are not allocated before the next garbage collection time, then frame 173 will be completely available and can be queued from the empty FRMTE anchor for subsequent return to the global available frame queue.

In accordance with objects of the present invention, the grouping of blocks during garbage collection, allocation of blocks from the beginning of the subpool queue, return of blocks from frame 173 (represented at the end of the subpool queue) to the collection queue, and return of the other blocks to the beginning of the subpool queue have the following effects. Assuming the subpool is not completely utilized/allocated between garbage collection times, the blocks of the frame 173 at the end of the queue will not be allocated for new requests. However, when other blocks of frame 173 are returned after use, they will be queued in the collection queue. As noted above, the blocks from the collection queue are not allocated unless the subpool queue becomes empty and there is another request for this subpool. The blocks on the collection queue at the next garbage collection time will be combined with the blocks from the subpool queue, and in the illustrated example, complete the availability of frame 173. (Also, at this next garbage collection time, all of the returned blocks of every incomplete frame will be clustered together on the subpool queue as described above.) Therefore, the aforesaid technique increases the chance that the frame at the end of the queue will be completely available at the next garbage collection time and can subsequently be returned in whole to the global available frame queue 180. As noted above, the present invention can be expanded to return blocks to the collection queue from more than one frame represented at or near the end of the subpool queue.

Also, in accordance with objects of the present invention, there is little overhead required to allocate and return blocks, and perform garbage collection. As described in more detail below, the block allocation and block return routines are short, and the garbage collection routine is performed only once every thirty seconds. Also, the search for the block to allocate from each subpool, the decision of which queue to receive the returned block and the search for the location in the queue to receive the block is short.

Figure 4:
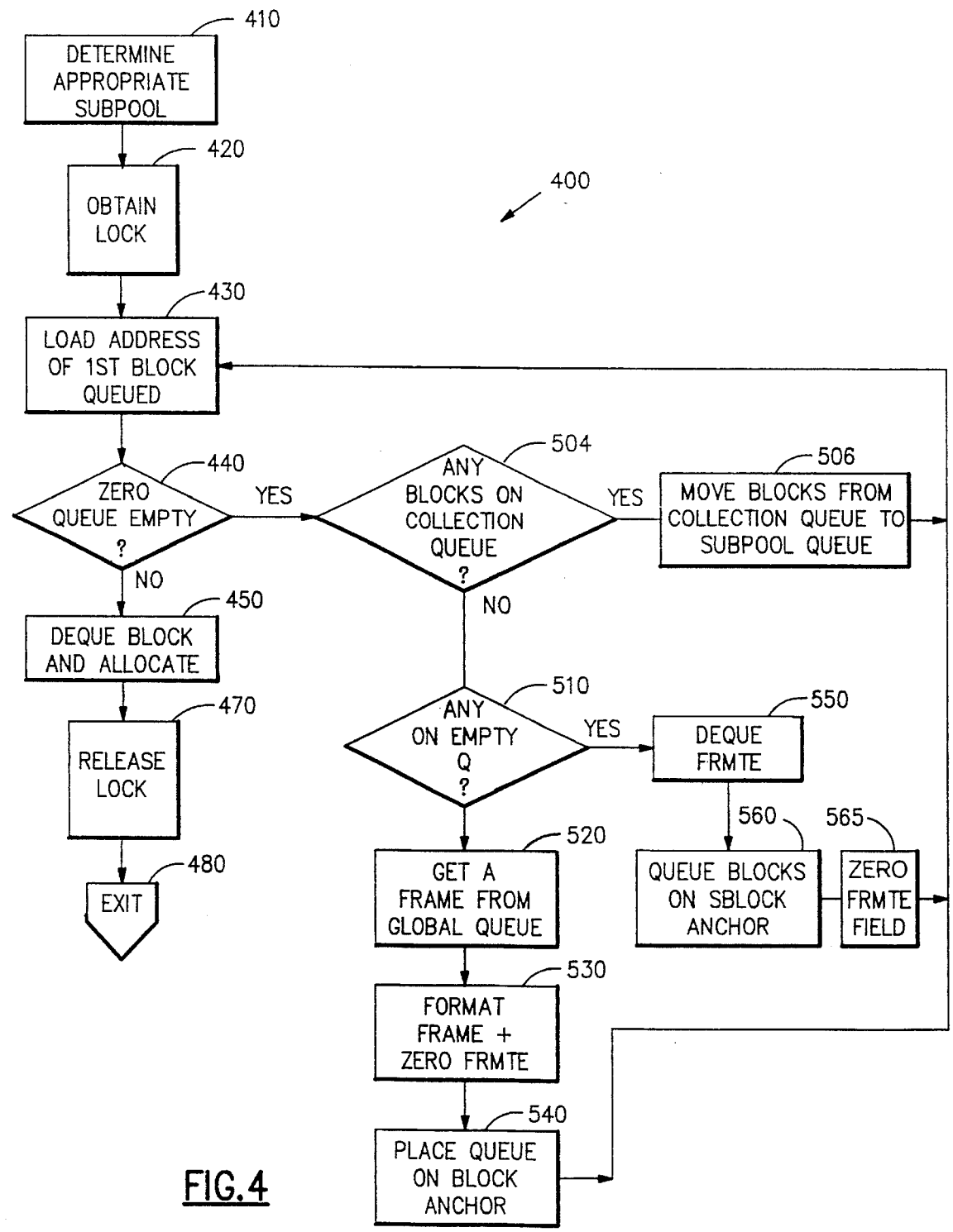
FIG. 4 is a flow chart of a block allocation routine of a free storage manager program within the operating system of FIG. 1.

FIG. 4 illustrates the block allocation routine 400 of the free storage manager program 140. This routine is invoked when subsystem 125 or any other program requests a block of main storage. In step 410, the block allocation routine 400 searches for the subpool having the smallest predetermined block size that will satisfy the request. This is done by indexing into a table 412 (FIG. 1) a number of rows equal to the requested number of double words. Each of the rows in table 412 points to the subpool having a block size that exactly equals the request or exceeds the request by a smaller amount than any of the other subpools. Next, routine 400 obtains a lock on the subpool control block by setting field 310, and then reads the subpool queue anchor 320 which is either the address of the first block on the subpool queue or zero if the subpool is empty (step 430). Next, routine 400 determines if the block anchor address is zero (decision 440). If not, then there are available blocks on the subpool queue, and the routine 400 removes the first block on the subpool (and changes the block anchor to point to the next block) and supplies the block address to the requestor (step 450). Next, routine 400 releases the lock (step 470).

Referring again to decision 440, if the subpool queue is empty, the block allocation routine 400 attempts to satisfy the allocation request from the collection queue. Thus, the block allocation routine 400 reads the collection queue anchor 370 which is either the address of the first block on the collection queue or zero if the collection queue is empty (decision 504). If the collection queue is not empty, then the block allocation routine moves the block(s) from the collection queue to the subpool queue by changing the subpool queue anchor to point to the first block on the collection queue and changing the collection queue anchor to zero (step 506). Then, the block allocation routine returns to step 430 to allocate the first block on the subpool queue.

Referring again to decision 504, if there are no blocks on the collection queue either, then the block allocation routine reads the empty FRMTE anchor 350 to determine if there are any frames which are completely available, not represented on the subpool queue and not yet returned to the global available frame queue 180. If there is such a frame (decision 510), then routine 400 dequeues the first such frame (whose address is indicated by the empty FRMTE anchor 350) by changing the pointer in the anchor 350 to point to the second such frame if one exists or zero if no such second frame exists (step 550). Next, the block allocation routine changes the subpool queue anchor 320 to point to the first block in the frame dequeued from the empty FRMTE queue, by copying the anchor 220 to the anchor 320. Then, the fields 210, 220, 230 and 235 are cleared. Next, the routine jumps to step 430 to allocate the first block in the subpool queue in the manner described above.

Referring again to decision 510, if the subpool queue and collection queue are empty and there are no completely available frames indicated by the empty FRMTE anchor (that have not yet been returned to the global available frame queue 180), then the block allocation routine dequeues the first frame in the global available frame queue 180 (by changing the global available frame queue anchor to point to the next completely available frame on the queue 180) (step 520). Then, the routine 400 logically divides the frame into blocks whose size equals that of the subpool, queues the blocks together and initializes the corresponding FRMTE by clearing fields 210, 220, 230, 235 (step 530). Next the routine 400 places that queue on the subpool anchor (step 540). Then, the routine 400 jumps to step 430 to allocate the first block in the subpool queue.

Figure 5A:
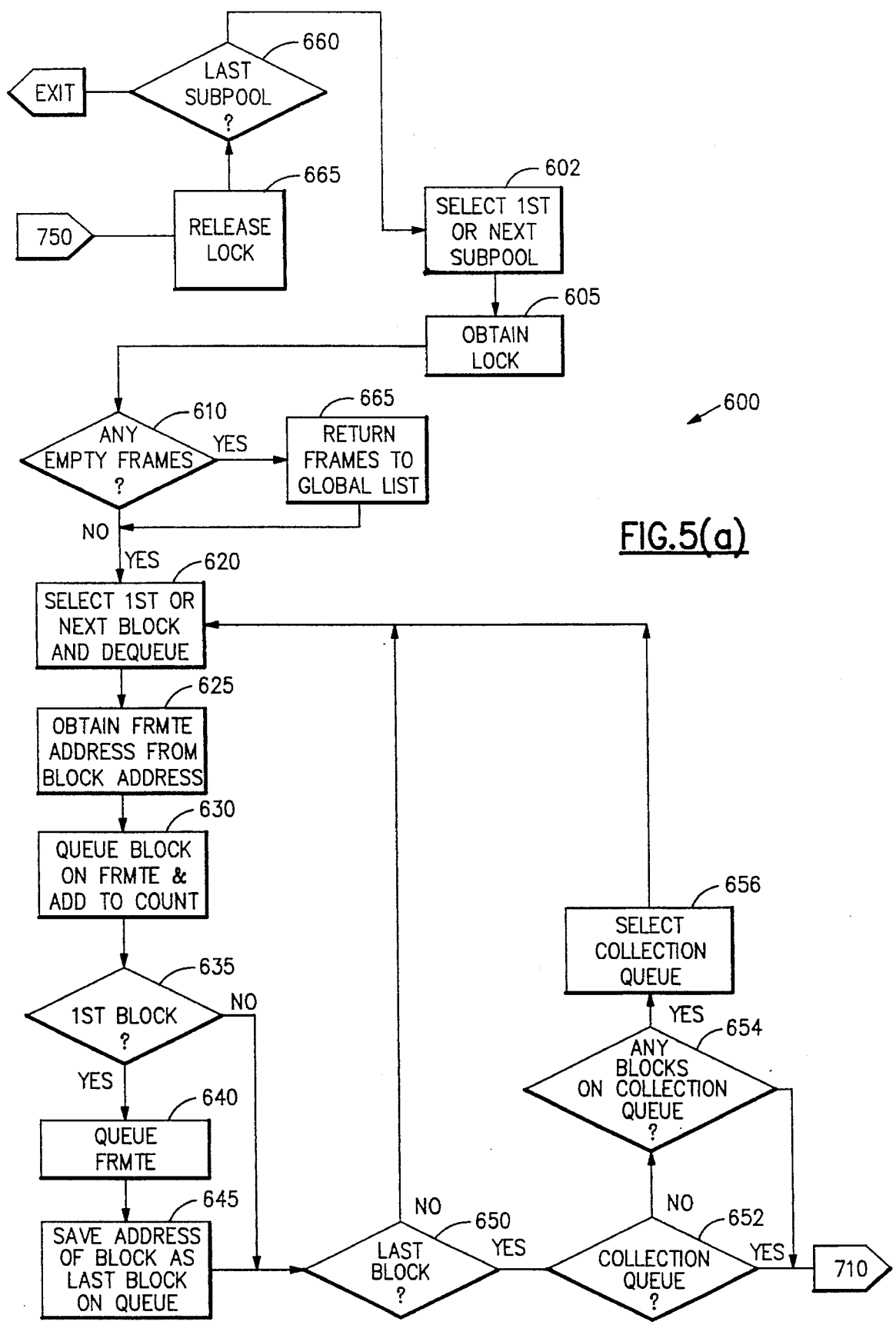
FIGS. 5(a) and (b) form a flow chart of a garbage collection routine within the free storage manager program of the operating system of FIG. 1.
Figure 5B:
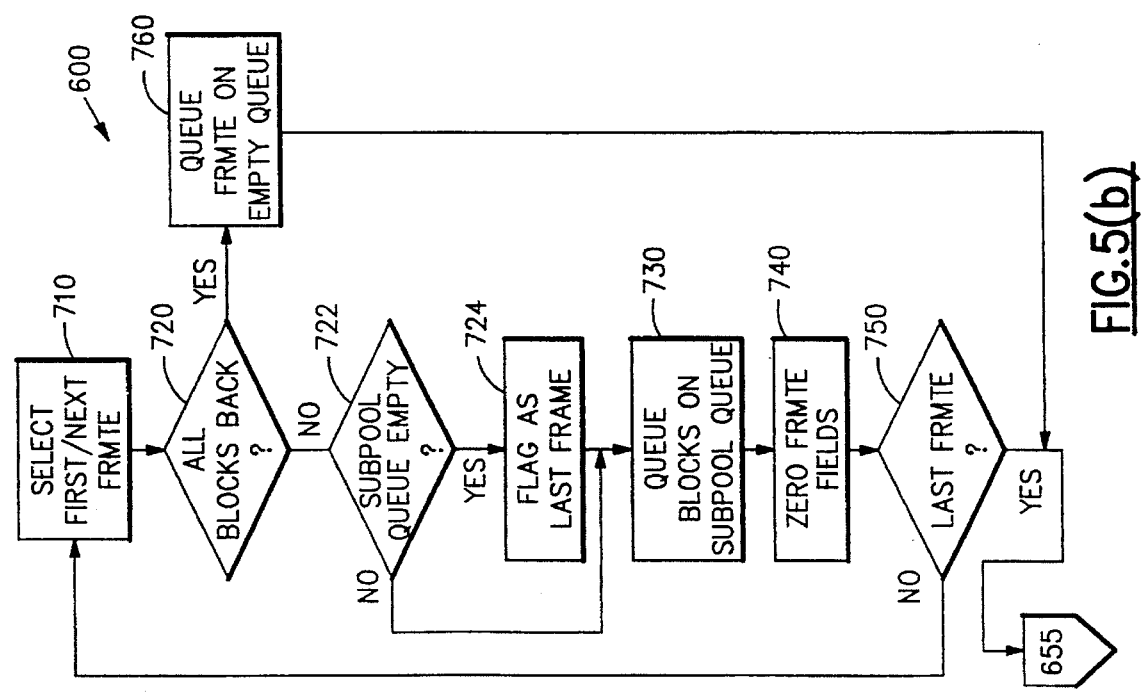

FIGS. 5(a) and (b) illustrate the garbage collection routine 600 of the free storage manager program 140. This routine is invoked periodically (for example, every thirty seconds) by a timing mechanism. In step 602, the garbage collection routine selects the first or next subpool for which to perform garbage collection. As noted above, the subpool control blocks are stored in contiguous storage locations in main storage, and the subpool control block with the lowest address is the first one selected for garbage collection. Next, the routine 600 obtains a lock on the selected subpool control block (step 605), and then reads the empty frame anchor 350 to determine if there are any completely available frames that have not yet been returned to the global available frame queue 180 (decision 610). As described in more detail below, during each instance of garbage collection, the completely available frames are identified and chained from the empty frame anchor 350 of the subpool control block but not returned to the global available frame queue 180 until the next instance of garbage collection. This delay is provided to prevent the return of such a completely available frame which became completely available during an unusual lull in requests. It requires more overhead to satisfy a subsequent request from the global available frame queue than from the empty FRMTE anchor queue. If there are one or more completely available frames currently chained from the empty FRMTE anchor 360, then they are now dequeued from anchor 350 and queued onto the global available frame queue 180 (step 665). If not, or after step 665, the routine 600 selects and dequeues the first block that is anchored from the subpool queue anchor 320 (step 620). Then, routine 600 calculates the FRMTE address, from the frame address (step 625) based on the following equation:

$$FRMTE\ ADDR = FRAME\ \#*FRMTE\ size + FRAME\ TABLE\ origin\ 170$$

where bits 1–19 of the block address=FRAME #.

Next, routine 600 queues this block from the FRMTE and increments the count field 235 in the FRMTE (step 630). Next, the routine 600 determines if this is the first block from this FRMTE that is queued on the subpool queue (decision 635), and if so, queues the FRMTE with the other FRMTEs representing other frames that had blocks on this subpool queue (step 640). This queuing uses the pointer field 210. Next, the routine 600 saves the address of this block in field 230 (step 645). Note that because the queue mechanism is a push down stack the first block queued will be the last block on the queue after all blocks are queued. Then, the routine 600 determines if there are any other blocks on the subpool queue (decision 650), and if so, jumps to step 620 to queue this next block from the respective FRMTE. The foregoing process is repeated until the last block on the subpool queue has been queued on the respective FRMTE (decision 650). Then, the routine 600 determines that steps 620–645 were just performed for the subpool queue (and not the collection queue) (step 652), and determines if there are any blocks on the collection queue (decision 654). If so, then routine 600 selects the collection queue to contribute to the respective FRMTE, in the illustrated example, the FRMTE for frame 173 (step 656). Thus, routine 600 loops back to steps 620–645 to add the blocks of the collection queue to this FRMTE.

After all of the blocks of the collection queue have been added to the respective FRMTE (decisions 650 and 652), then the routine 600 proceeds to step 710 and selects the first FRMTE obtained from the subpool queue for examination (step 710). Subroutine 600 determines from the count field 235 if all of the blocks are now queued to the FRMTE, i.e. are now available (decision 720). If so, then this FRMTE is chained from the empty frame anchor 350 for the subpool, and that successfully completes the garbage collection for this frame. Field 200 of this FRMTE is left intact so that it may subsequently be used to easily move the queue of blocks from the empty frame to the subpool anchor 320 if the subpool becomes empty. However, if this FRMTE is not now completely available, then the blocks of this FRMTE must be requeued on the subpool queue. In decision 722, the routine 600 determines if this FRMTE contains the first block to be queued on the subpool queue. Because each subsequent block that is queued on the subpool queue displaces the previous block(s) one position rearward, the first block queued will become the last block on the subpool queue at the conclusion of the garbage collection process. As noted above, the subsequently returned blocks for the last frame represented on the subpool queue are queued on the collection queue (and not the subpool queue). Therefore, the identity of the last frame represented on the subpool queue must be known so that when blocks are returned they can be queued on the proper queue. Accordingly, the routine 600 stores the address of this frame in field 380 (step 724). Next, routine 600 successively queues (in a cluster) all the available blocks of this FRMTE on the subpool queue from subpool queue anchor 320 (step 730). This requires a pointer from the subpool queue to the first available block in the frame and a pointer from the last available block in the frame to the remainder of the subpool queue. Then, the routine 600 zeros all the fields in the FRMTE to initialize for the next garbage collection. The foregoing process is repeated for each of the FRMTEs which contains the other available blocks of the subpool (decision 750). Then, the routine 600 jumps to step 655 to release the lock on this subpool control block. If there are other subpools requiring garbage collection (decision 660), then routine 600 repeats the process of FIGS. 5(a) and 5(b) for these other subpools by jumping to step 600.

There are two beneficial effects from the garbage collection illustrated in FIGS. 5(a) and (b). First, all of the frames which are now completely available are chained from the empty FRMTE anchor for subsequent return to the global available frame queue 180 during the next instance of garbage collection. Second, all of the blocks of each partially available frame are grouped together so that the block return routine 800 described below can return new blocks in such a way as to yield additional completely available frames.

Figure 6:
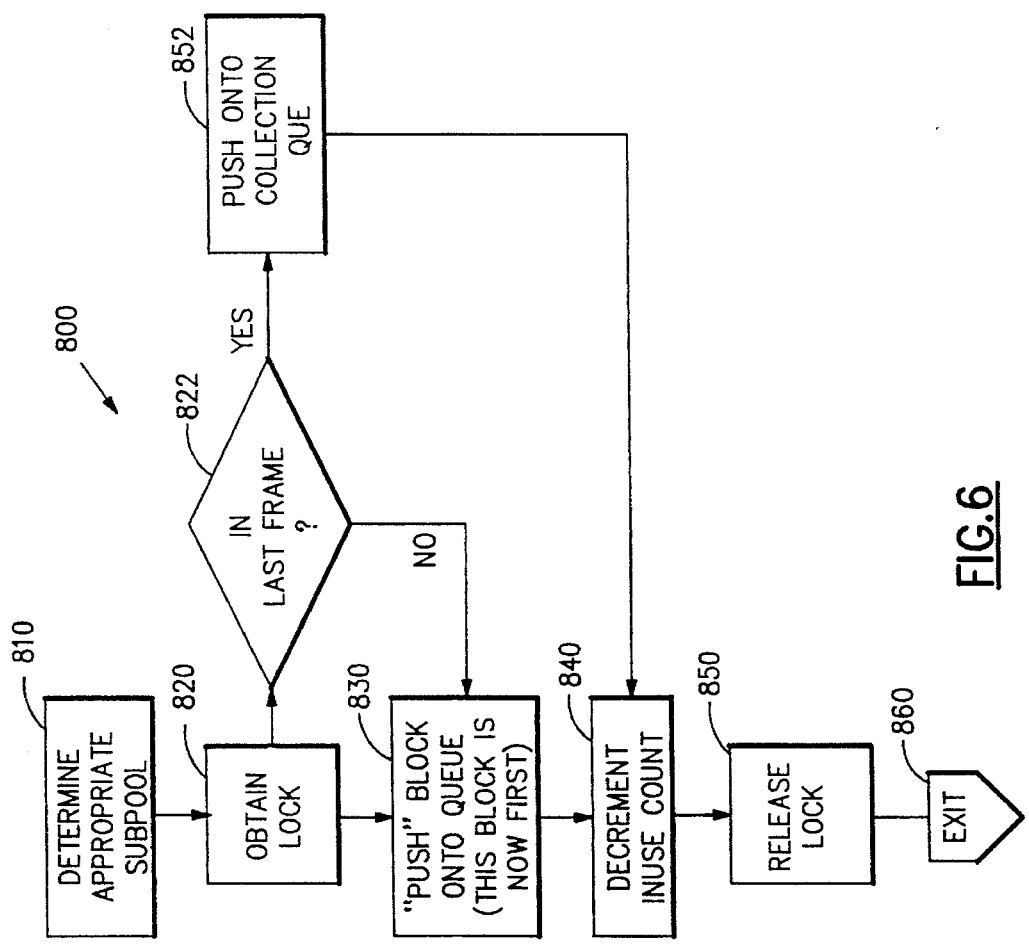
FIG. 6 is a flow chart of a block return routine of the free storage manager program of the operating system of FIG. 1.

FIG. 6 illustrates the block return routine 800. This routine is called by the subsystem 125 or any other program when it no longer requires a block and returns it for use by another subsystem or any other program. In step 810, routine 800 determines from the table 412 which subpool contains blocks of the size that is being returned (step 810) and obtains a lock on the subpool (step 820). Next, the routine 800 must determine whether to return the block to the subpool queue or the collection queue. Consequently, the routine 800 compares the address of the returned block to field 380 corresponding to the last frame represented on the subpool queue. If the returned block is not part of the last frame represented on the subpool queue (decision 822), then the routine 800 queues the block into the first position on the subpool queue (step 830). Step 830 requires only that the block anchor 320 be changed to point to the new block, and a pointer be written into the returned block to point to the next block on the subpool queue. Next, the routine 800 decrements the in use count for this subpool because the block is no longer in use (step 840), and removes the lock on the subpool (step 850).

Referring again to decision 822, if the returned block is part of the frame represented last on the subpool queue, then the block is queued first on the collection queue (step 852), and then steps 840 and 850 are executed.

It should be rioted that because blocks are allocated from the beginning of the subpool queue and, with the exception of those blocks returned to the collection queue, returned to the beginning of the subpool queue, if the subpool queue is under utilized, then the blocks of the frames at the end of the subpool will not likely be allocated. Thus, as blocks are returned, some of the returned blocks will be from the frames at the end of the subpool and complete the availability of the frames at the end. The use of the collection queue for one (or more) specific frame(s) at the end of the subpool queue greatly increases the chances that the frames represented by the blocks on the collection queue will be completely available at the next garbage collection time. However, the clustering of other blocks of one or more other frames near the end of the subpool queue also increases the chance that these other frames will be completely available at the next garbage collection time because they are less likely to be allocated. Therefore, even without the use of the collection queue and with return of all blocks to the beginning of the subpool queue, there would be an increased chance of completely available frames at garbage collection time. Also, allocation of blocks from the beginning of the subpool queue and return of blocks either to the beginning of the subpool queue or the beginning of the collection queue requires minimal overhead.

Based on the foregoing, a system, method and program according to the present invention have been disclosed. However, numerous modifications and substitutions can be made without deviating from the scope of the present invention. For example, if desired, the returned blocks from the frames represented at or near the end of the subpool queue can be returned to the end of the subpool queue instead of to the collection queue. This would have the same effect of avoiding re-allocation of the returned blocks from the frames represented after garbage collection time at the end of the subpool queue. However, a second pointer would be required for the end of the subpool queue. Therefore, the invention has been disclosed by way of illustration and not limitation and reference should be made to the following claims to determine the scope of the present invention.

We claim:

1. A computer storage management system comprising:

means for queuing available blocks of one size from a multiplicity of different storage frames;

means for allocating blocks from a position in the queue to satisfy need for said blocks;

means for returning at least some blocks of said one size from different frames to said position in said queue after the need for said some blocks ends, a plurality of the returned blocks not being adjacent to a block of the same frame; and garbage collection means, operated after blocks have been allocated and returned and subsequently after other blocks have been allocated and returned, for removing from said queue all blocks of a plurality of frames which are completely available and requeuing said queue such that all blocks, including the nonadjacent blocks, of a plurality of partially available frames are in clusters for respective frames.

2. A system as set forth in claim 1 wherein the garbage collection means is invoked periodically or occasionally, and the returning means returns the completely available frames to an available list or pool of frames of main storage during the next invocation of the garbage collection means.

3. A system as set forth in claim 1 wherein the queuing means comprises:

means, responsive to a request for a storage block of said one size and an absence of blocks in said queue to satisfy said request, for selecting a completely available frame from main storage, allocating a block of said frame to satisfy said request, dividing the remainder of said frame into other blocks of said one size, and queuing said other blocks in said queue.

4. A computer storage management system comprising:

means for queuing available blocks of one size from a multiplicity of different storage frames;

means for allocating blocks from a position in the queue to satisfy need for said blocks;

means for returning at least some blocks of said one size from different frames to said position in said queue after the need for said some blocks ends, a plurality of the returned blocks not being adjacent to a block of the same frame; and garbage collection means, operated after blocks have been allocated and returned and subsequently after other blocks have been allocated and returned, for removing from said queue all blocks of a plurality of frames which are completely available and requeuing said queue such that all blocks, including the nonadjacent blocks of a plurality of partially available frames are in clusters for respective frames; and wherein the returning means returns blocks from one or more frames having blocks clustered at or near another position of said queue to a different position than the first said position of said queue; and the allocating means allocates said blocks returned to said different position and the clustered blocks of said one or more frames after the returned and clustered blocks at and near the first said position of said queue.

5. A system as set forth in claim 4 wherein the first said position of said queue is one end of said queue, and said other position is an opposite end of said queue.

6. A system as set forth in claim 4 wherein the garbage collection means is invoked periodically or occasionally, and the returning means returns the completely available frames to an available list or pool of frames of main storage during the next invocation of the garbage collection means; and the garbage collection means queues the blocks in each completely available frame from one another in another queue at garbage collection time, and if a request is made for a block of said one size, the first said queue is empty and there are no blocks at said different position, the allocating means satisfies the request from one of the completely available frames on said other queue, said one frame being removed from the first said queue during the last garbage collection.

7. A computer storage management system comprising:

means for queuing available blocks of one size from a multiplicity of different storage frames;

means for allocating blocks from a position in the queue to satisfy need for said blocks;

means for returning at least some blocks of said one size from different frames to said position in said queue after the need for said some blocks ends, a plurality of the returned blocks not being adjacent to a block of the same frame; and garbage collection means, operated after blocks have been allocated and returned and subsequently after other blocks have been allocated and returned, for removing from said queue all blocks of a plurality of frames which are completely available and requeuing said queue such that all blocks, including the nonadjacent blocks, of all partially available frames are in clusters for respective frames.

8. A computer storage management system comprising:

means for queuing available blocks of one size from a multiplicity of different storage frames;

means for allocating blocks from a position in the queue to satisfy need for said blocks;

means for returning at least some blocks of said one size from different frames to said position in said queue after the need for said some blocks ends, a plurality of the returned blocks not being adjacent to a block of the same frame; and garbage collection means, operated after blocks have been allocated and returned and subsequently after other blocks have been allocated and returned, for removing from said queue all blocks of a plurality of frames which are completely available and requeuing said queue such that all blocks, including the nonadjacent blocks, of a plurality of partially available frames are in clusters for respective frames; and wherein the frames were originally obtained from an available list or available pool of frames of main storage; and further comprising means for returning the completely available frames to said available list or available pool of frames of main storage.

9. A computer program product for storage management, said computer program product comprising:

a computer readable medium;

first program instruction means for instructing a computer processor to queue available blocks of one size from a multiplicity of different storage frames;

second program instruction means for instructing a computer processor to allocate blocks from a position in the queue to satisfy need for said blocks;

third program instruction means for instructing a computer processor to return at least some blocks of said one size from different frames to said position in said queue after the need for said some blocks ends, a plurality of the returned blocks not being adjacent to a block of the same frame; and fourth program instruction means for instructing a computer processor, after blocks have been allocated and returned and subsequently after other blocks have been allocated and returned, to remove from said queue all blocks of a plurality of frames which are completely available and requeue said queue such that all blocks, including the nonadjacent blocks, from a plurality of partially available frames are in clusters for respective frames; and wherein each of said program instruction means is recorded on said medium in executable form.

10. A computer program product as set forth in claim 9 wherein said third program instruction means instructs the associated processor to return blocks from one or more frames having blocks clustered at or near another position of said queue to a different position than the first said position of said queue; and said second program instruction means instructs the associated processor to allocate said blocks returned to said different position and the clustered blocks of said one or more frames after the returned and clustered blocks at and near the first said position of said queue.

11. A computer program product as set forth in claim 9 wherein said fourth program instruction means instructs the associated processor to requeue said queue such that all blocks of all partially available frames are in clusters for respective frames.

12. A computer program product as set forth in claim 9 wherein said frames were originally obtained from an available list or available pool of main storage; and further comprising fifth program instruction means for instructing a computer processor to return the completely available frames to said available list or available pool of frames of main storage; and wherein the fourth program instruction means is invoked periodically or occasionally;

the fifth program instruction means instructs the associated processor to return the completely available frames to said available list or available pool of frames of main storage during the next invocation of the fourth program instruction means; and said fifth program instruction means is recorded on said medium in executable form.

13. A computer program product as set forth in claim 9 wherein the first program instruction means comprises:

fifth program instruction means for instructing a computer processor to respond to a request for a storage block of said one size and an absence of blocks in said queue to satisfy said request, by selecting a completely available frame from main storage, allocating a block of said frame to satisfy said request, dividing the remainder of said frame into other blocks of said one size, and queuing said other blocks in said queue; and wherein said fifth program instruction means is recorded on said medium in executable form.

14. A computer program product as set forth in claim 9 wherein said program product, when loaded into a computer, forms part of a computer operating system.

15. A computer program product for storage management, said computer program product comprising:

a computer readable medium;

first program instruction means for instructing a computer processor to queue available blocks of one size from a multiplicity of different storage frames;

second program instruction means for instructing a computer processor to allocate blocks from one end of the queue to satisfy need for said blocks;

third program instruction means for instructing a computer processor to return at least some blocks of said one size from different frames to said one end of said queue after the need for said some blocks ends, a plurality of the returned blocks not being adjacent to a block of the same frame; and fourth program instruction means for instructing a computer processor, after blocks have been allocated and returned and subsequently after other blocks have been allocated and returned, to remove from said queue all blocks of a plurality of frames which are completely available and requeue said queue such that all blocks, including the nonadjacent blocks, from a plurality of partially available frames are in clusters for respective frames; and wherein said third program instruction means instructs the associated processor to return blocks from one or more frames having blocks clustered at or near an opposite end of said queue to a different position than said one end of said queue;

said second program instruction means instructs the associated processor to allocate said blocks returned to said different position and the clustered blocks of said one or more frames after the returned and clustered blocks at and near said one end of said queue; and each of said program instruction means is recorded on said medium in executable form.

16. A method for managing computer storage, said method comprising the steps of:

queuing available blocks of one size from a multiplicity of different storage frames;

allocating blocks from a position in the queue to satisfy need for said blocks;

returning at least some blocks of said one size from different frames to said position in said queue after the need for said some blocks ends, a plurality of the returned blocks not being adjacent to a block of the same frame; and after blocks have been allocated and returned and subsequently after other blocks have been allocated and returned, removing from said queue all blocks of a plurality of frames which are completely available and requeuing said queue such all blocks, including the nonadjacent blocks, of a plurality of partially available frames are in clusters for respective frames.

17. A method as set forth in claim 16 further comprising the steps of:

responsive to a request for a storage block of said one size and an absence of blocks in said queue to satisfy said request, selecting a completely available frame from main storage, allocating a block of said frame to satisfy said request, dividing the remainder of said frame into other blocks of said one size, and queuing said other blocks in said queue.

18. A method for managing computer storage, said method comprising the steps of:

queuing available blocks of one size from a multiplicity of different storage frames;

allocating blocks from a position in the queue to satisfy need for said blocks;

returning at least some blocks of said one size from different frames to said position in said queue after the need for said some blocks ends, a plurality of the returned blocks not being adjacent to a block of the same frame; and after blocks have been allocated and returned and subsequently after other blocks have been allocated and returned, removing from said queue all blocks of a plurality of frames which are completely available and requeuing said queue such all blocks, including the nonadjacent blocks, of a plurality of partially available frames are in clusters for respective frames; and wherein the returning step returns blocks from one or more frames having blocks queued at or near another position of said queue to a different position than the first said position of said queue; and the allocating step allocates said blocks returned to said different position and the clustered blocks of said one or more frames after the returned and clustered blocks at and near the first said position of said queue.

19. A method as set forth in claim 18 wherein the first said position of said queue is one end of said queue, and said other position is an opposite end of said queue.

20. A method for managing computer storage, said method comprising the steps of:

queuing available blocks of one size from a multiplicity of different storage frames;

allocating blocks from a position in the queue to satisfy need for said blocks;

returning at least some blocks of said one size from different frames to said position in said queue after the need for said some blocks ends, a plurality of the returned blocks not being adjacent to a block of the same frame; and after blocks have been allocated and returned and subsequently after other blocks have been allocated and returned, removing from said queue all blocks of a plurality of frames which are completely available and regueuing said queue such all blocks, including the nonadjacent blocks, of all partially available frames are in clusters for respective frames.

21. A method for managing computer storage, said method comprising the steps of:

queuing available blocks of one size from a multiplicity of different storage frames;

allocating blocks from a position in the queue to satisfy need for said blocks;

returning at least some blocks of said one size from different frames to said position in said queue after the need for said some blocks ends, a plurality of the returned blocks not being adjacent to a block of the same frame; and after blocks have been allocated and returned and subsequently after other blocks have been allocated and returned, removing from said queue all blocks of a plurality of frames which are completely available and requeuing said queue such all, blocks, including the nonadjacent blocks, of a plurality of partially available frames are in clusters for respective frames; and wherein said frames were originally obtained from an available list or available pool of frames of main storage; and further comprising the step of returning the completely available frames to said available list or available pool of frames of main storage and wherein the removing and requeuing steps are performed periodically or occasionally, and further comprising the step of returning completely available frames to said available list or available pool of frames of main storage during the next performance of the removing and requeuing steps.

22. A computer storage management system comprising:

means for allocating blocks from a queue to satisfy a need for said blocks, said queue comprising available blocks of one size from a multiplicity of different storage frames;

means for returning at least some blocks of said one size from a plurality of different frames to a predetermined position in said queue after the need for said some blocks ends, a plurality of the returned blocks not being adjacent to a block of the same frame; and means, operated after blocks have been allocated and returned and subsequently after other blocks have been allocated and returned, for removing from said queue all blocks of a plurality of frames which are completely available and requeuing said queue such that all blocks, including the nonadjacent blocks, of a plurality of partially available frames are in clusters for respective frames; and wherein the allocating means re-allocates said some blocks before allocating clustered blocks of a plurality of said frames.

23. A system as set forth in claim 22 wherein:

the allocating means allocates blocks from a fixed position in said queue;

the returning means returns blocks from one or more frames to a different position than said predetermined position of said queue, said one or more frames having blocks clustered away from said fixed position; and the allocating means re-allocates said some blocks before re-allocating said blocks returned to said different position and the clustered blocks of said one or more frames.

24. A system as set forth in claim 23 wherein the allocating means also allocates clustered blocks of frames near said fixed position before allocating said blocks returned to said different position and the clustered blocks of said one or more frames.

25. A computer storage management system comprising:

means for allocating blocks from a predetermined position in a queue to satisfy a need for said blocks, said queue comprising available blocks of one size from a multiplicity of different storage frames;

means for returning at least some blocks of said one size from a plurality of different frames to said predetermined position in said queue after the need for said some blocks ends, a plurality of the returned blocks not being adjacent to a block of the same frame; and means, operated after blocks have been allocated and returned and subsequently after other blocks have been allocated and returned, for removing from said queue all blocks of a plurality of frames which are completely available and requeuing said queue such that all blocks, including the nonadjacent blocks, of a plurality of partially available frames are in clusters for respective frames; and wherein the allocating means re-allocates said some blocks before allocating clustered blocks of a plurality of said frames;

the returning means returns blocks from one or more frames to a different position than said predetermined position of said queue, said one or more frames having blocks clustered away from said predetermined position;

the allocating means re-allocates said some blocks before re-allocating said blocks returned to said different position and the clustered blocks of said one or more frames.

26. A computer implemented method for managing storage, said method comprising the steps of:

queuing all blocks of one size of a multiplicity of partially available frames of storage into clusters for respective frames;

after the quelling step, allocating blocks from the queue to satisfy a need for said blocks and returning at least some blocks of said one size from a plurality of different frames to a predetermined position in said queue after the need for said some blocks ends, a plurality of the returned blocks not being adjacent to a block of the same frame, and re-allocating said some blocks before allocating clustered blocks of a plurality of said frames; and after blocks have been allocated, returned and re-allocated, removing from said queue all blocks of a plurality of frames which are completely available and requeuing said queue such that all blocks, including nonadjacent blocks, of a plurality of partially available frames are in clusters for respective frames.

27. A computer implemented method for managing storage, said method comprising the steps of:

queuing all blocks of one size of a multiplicity of partially available frames of storage into clusters for respective frames;

after the queuing step, allocating blocks from a fixed position in the queue to satisfy a need for said blocks and returning at least some blocks of said one size from a plurality of different frames to a predetermined position in said queue after the need for said some blocks ends, a plurality of the returned blocks not being adjacent to a block of the same frame, and re-allocating said some blocks before allocating clustered blocks of a plurality of said frames; after blocks have been allocated, returned and re-allocated, removing from said queue all blocks of a plurality of frames which are completely available and requeuing said queue such that all blocks, including nonadjacent blocks, of a plurality of partially available frames are in clusters for respective frames;

returning blocks from one or more frames to a different position than said predetermined position of said queue, said one or more frames having blocks clustered away from said fixed position; and re-allocating said some blocks before re-allocating said blocks returned to said different position and the clustered blocks of said one or more frames.

28. A method as set forth in claim 27 wherein the allocating step also allocates clustered blocks of frames near said fixed position before allocating said blocks returned to said different position and the clustered blocks of said one or more frames.

29. A method as set forth in claim 27 wherein said predetermined position is said fixed position.

* * * * *